US010535330B2

(12) United States Patent
Kushner (10) Patent No.: US 10,535,330 B2
(45) Date of Patent: Jan. 14, 2020

(54) SYSTEM AND METHOD FOR MOVIE KARAOKE (71) Applicant: Crackle, Inc., Sausalito, CA (US)

(72) Inventor: Robert Kushner, Los Angeles, CA (US)

(73) Assignee: CRACKLE, INC., Sausalito, CA (US)

(*) Notice: Subject to any disclaimer, the term of this patent is extended or adjusted under 35 U.S.C. 154(b) by 66 days.

(21) Appl. No.: 14/452,456

(22) Filed: Aug. 5, 2014

(65) Prior Publication Data

US 2015/0037777 A1 Feb. 5, 2015

Related U.S. Application Data (60) Provisional application No. 61/862,263, filed on Aug. 5, 2013.

(51) Int. Cl.
G10H 1/36 (2006.01)
H04N 21/81 (2011.01)
(Continued)

(52) U.S. Cl.
CPC ........... *G10H 1/361* (2013.01); *H04N 5/9207* (2013.01); *H04N 5/9305* (2013.01); *H04N 21/8126* (2013.01)

(58) Field of Classification Search
CPC .. G10H 1/361; G10H 2220/011; G09B 19/00; G09B 5/065
(Continued)

(56) References Cited

U.S. PATENT DOCUMENTS 5,613,909 A * 3/1997 Stelovsky ............. A63F 13/005
434/307 A
5,804,752 A * 9/1998 Sone ...................... G10H 1/361
369/53.31
(Continued)

FOREIGN PATENT DOCUMENTS

WO 20050055196 A2 6/2005

OTHER PUBLICATIONS

Yoostar 2: In the Movies. (Mar. 8, 2011). By Yoostar Entertainment. Retrieved Apr. 29, 2016, from http://www.amazon.com/Yoostar2MoviesXbox360/ dp/B004G7MDKI. pp. 1-6.*
(Continued)

*Primary Examiner* — Eddy Saint-Vil
(74) *Attorney, Agent, or Firm* — Mayer & Williams, PC (57) ABSTRACT While watching a movie, a user speaks lines of dialogue. The system records the speech, compares with the dialogue in the movie, and reports a score to the user. The system can share scores through an online service to create a community experience. In particular, the systems and methods disclosed implement a technique for matching user input to media content. A computer system receives audio input from a user (speech) and compares the received speech to dialogue in a movie or television program. For example, the computer system may convert the received speech to text and may compare the converted text against dialogue text using closed captioning or subtitle data. Alternatively, waveform data may be compared. The computer system generates a score for the speech based on how closely the speech matches the dialogue, and reports the score to the user through a user interface.

21 Claims, 6 Drawing Sheets (51) Int. Cl.
*H04N 5/92* (2006.01)
*H04N 5/93* (2006.01)
*G10L 25/57* (2013.01)
*G10L 15/26* (2006.01)

(58) Field of Classification Search
USPC .................................................. 434/307 A
See application file for complete search history.

(56) References Cited

U.S. PATENT DOCUMENTS

| | | | | |
|---|---|---|---|---|
| 7,806,759 | B2* | 10/2010 | McHale | A63F 13/10 |
| | | | | 463/7 |
| 7,973,230 | B2* | 7/2011 | Mahowald | G10H 1/368 |
| | | | | 434/307 A |
| 2007/0033005 | A1 | 2/2007 | Cristo et al. | |
| 2008/0010068 | A1* | 1/2008 | Seita | G09B 19/06 |
| | | | | 704/257 |
| 2012/0004911 | A1 | 1/2012 | Quan | |
| 2012/0077171 | A1* | 3/2012 | Rubio | G10H 1/361 |
| | | | | 434/307 A |
| 2013/0038792 | A1* | 2/2013 | Quigley | A61H 19/00 |
| | | | | 348/515 |
| 2014/0146230 | A1* | 5/2014 | Cooper | H04N 5/073 |
| | | | | 348/515 |

OTHER PUBLICATIONS

Author Unknown, Rosetta Course Speech Analysis Feature, Published May 8, 2012 downloaded at http://resources.rosettastone.com/assets/ce/1337093023/assets/pdfs/user_guides/rs/ce/ENG.pdf (48 pages total).

Author Unknown, Gaana.com Singalong Feature, published Jun. 12, 2013, 3 pages total http://yourstory.in/2013/06/dont-just-listen-now-sing-along-with-gaana-coms-newest-karaoke-feature-implications/.

* cited by examiner

SYSTEM AND METHOD FOR MOVIE KARAOKE

CROSS-REFERENCE TO RELATED APPLICATIONS

This application claims benefit of priority of U.S. Provisional Patent Application 61/862,263, filed Aug. 5, 2013, entitled "Movie Karaoke", which is incorporated by reference herein in its entirety.

FIELD

The invention relates to karaoke systems and methods.

BACKGROUND

The karaoke experience is one that users have enjoyed since the 1970s. However, the same has typically been limited to users providing vocalizations for songs. Such vocalizations have been provided as a signal input to a typical karaoke machine, which generally simply amplifies the user's voice, and which may to a certain extent provide signal conditioning. Karaoke functionality has also been provided within certain game platforms, and in this way players may compete on the basis of karaoke performance, as the game platform provides a score for the vocalization.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles meet the needs of the above in several ways. In particular, the systems and methods implement a technique for matching user input to media content. In one implementation, a computer system receives audio input from a user (speech) and compares the received speech to dialogue in a movie or television program. For example, the computer system may convert the received speech to text and may compare the converted text against dialogue text using closed captioning or subtitle data. Alternatively, waveform data may be compared. The computer system generates a score for the speech based on how closely the speech matches the dialogue, and reports the score to the user through a user interface. The system can also post the score with user information to a network location, such as to a social network service, or a high score table or leaderboard.

Features provided in certain implementations can include, but are not limited to, one or more of the following items: speech conversion from an audio file to text; comparison of speech text to text corresponding to movie dialogue (or other audio or video content); generation of a score for the received speech; and a facility to share the score with others through a computer network.

In one aspect, the invention is directed towards a method for operating a karaoke environment, including: displaying video on a display; receiving speech as a user audio segment using a microphone; marking the user audio segment with a timestamp; converting the user audio segment to user text; retrieving target text for the displayed video based on the timestamp; comparing the user text to the received target text; and generating a score based on a likeness between the user text and the target text.

Implementations of the invention may include one or more of the following. The method may further include sending the score to a network server and retrieving a score from the server associated with another user. The target text may be retrieved from closed captioning data or from subtitle data. The received speech may be in a different language than a language on the video, and the target text may include subtitles in the different language. The target text may be movie dialogue for the displayed video. The method may further include transmitting the score for display on a social networking site. The steps may be performed on a game console, a media player, a computer system, or a combination of the above. The retrieving target text may include converting a portion of a movie audio track to text using voice recognition, and associated the text so converted with a time stamp. The method may further include receiving an input from a user corresponding to a desired difficulty level, and the generating a score may be based on the difficulty level. At a low difficulty level, the method may further include displaying the target text. The method may further include muting or removing a portion of audio in the video corresponding to the target text. The method may further include: using a camera to detect a user motion; comparing the user motion with a stored record of a character motion within the video; generating a motion score based on the compared user motion and stored record of a character motion; and the generating a score may include generating a score based on the motion score and on the comparison of the user text to the received target text.

In another aspect, the invention is directed towards a non-transitory computer readable medium, including instructions for causing a computing environment to perform the above method.

In another aspect, the invention is directed towards a method for operating a karaoke environment, including: arranging at least two media players to be in network communication, each media player configured to perform steps of: displaying video on a display; receiving a selection of a character portrayed on the displayed video; receiving speech of the character as a user audio segment using a microphone; marking the user audio segment with a timestamp; converting the user audio segment to user text; retrieving target text for the displayed video based on the timestamp and/or a character profile; comparing the user text to the received target text; and generating a score based on a likeness between the user text and the target text. The method further includes a step of transmitting each user audio segment from the receiving media player to the other media player or players for playback.

Implementations of the method may include one or more of the following. The method may further include generating an overall score for each media player based on generated scores for all received speech. The method may further include generating a group score based on the generated scores for each media player. The method may further include, in each media player, and for the selected character, muting or removing a portion of audio in the video, the muted or removed portions corresponding to the target text. The method may further include, for each media player, using a camera to detect a user motion, comparing the user motion with a stored record of a character motion within the video, generating a motion score based on the compared user motion and stored record of a character motion, and the generating a score may include generating a score based on the motion score and on the comparison of the user text to the received target text.

In another aspect, the invention is directed towards a non-transitory computer readable medium, including instructions for causing a computing environment to perform the above method.

In yet another aspect, the invention is directed towards a media player configured to operate a karaoke environment, including: a display module configured to displaying video on a display; an input module configured to receive speech as a user audio segment using a microphone; a data retrieval module configured to retrieve target audio for the displayed video; a comparison module configured to compare the user audio segment to the received target audio; and a scoring module configured to generate a score based on a likeness between the user audio segment and the target audio.

Implementations of the invention may include one or more of the following. The media player may further include a voice recognition module configure to convert either the user audio segment or the target audio or both to text form. The comparison module may be configured to compare the user audio segment and the target audio in text form, and the comparison module may retrieve the target audio in text form from closed-captioning data or subtitles data.

Advantages of the invention may include, in certain embodiments, one or more of the following. Users may be enabled to compete against each other or themselves in their knowledge and performance of movie dialogue. Users may employ the system and method in other ways as well, e.g., voice training, acting training, group competitions, and the like. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless specifically noted.

DETAILED DESCRIPTION

In the new system, a computer system receives and processes user input and then compares that input to media content. In one example, and referring to the system 10 of FIG. 1, a user 12 speaks a line of dialogue into a microphone 16 from a movie, e.g., while watching the movie on a television 24, in an attempt to match the movie dialogue. The television may then display a score indicating how closely the spoken dialogue matches the movie dialogue. The line may be selected by the user 12 arbitrarily, and generally corresponds to key phrases or memorable lines. However, the choice is arbitrary and can even represent a substantial portion (or all) of the movie spoken dialogue. In this description an example is discussed in which the user 12 speaks a line of dialogue or speech (a "user audio segment 14") which corresponds to a line 18 within the video, and in particular within its audio track 22. The length (in time) of the user audio segment 14 is arbitrary, and thus the "amount" of speech within the track 22 (represented or mimicked by the user audio segment) is also arbitrary.

Figure 1:
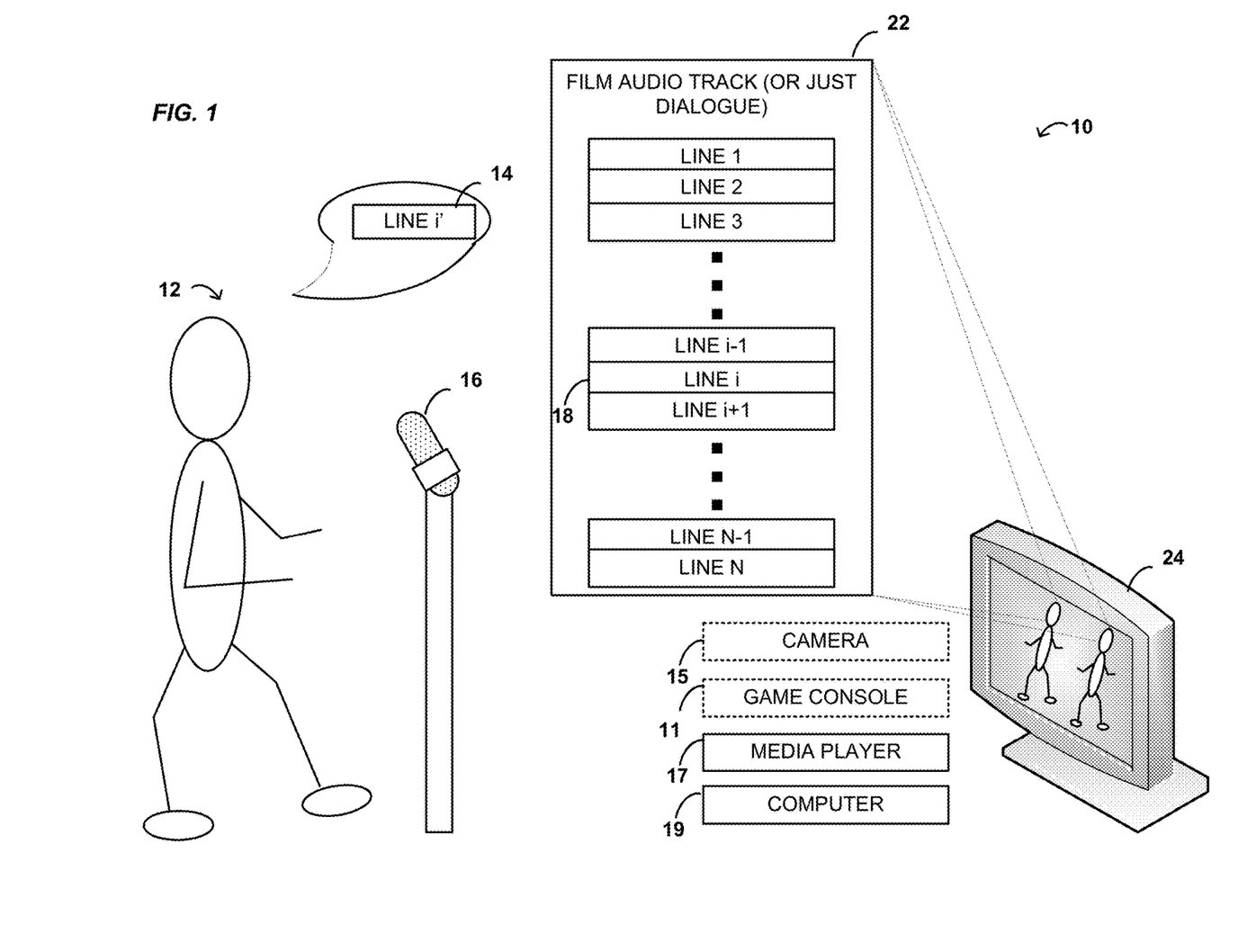
FIG. 1 shows a schematic layout of a movie karaoke system according to present principles.

In the television example, the television 24 may be connected to a media player 17 and a computer system 19, as well as to the microphone 16 and an optional camera 15. In an alternative implementation, either the media player or the computer system (or both) may perform the functions required for systems and methods according to present principles. In yet other implementations, the television may be enabled to perform needed functionality, or the television in combination with the media player and/or the computer system may be so enabled.

In yet another implementation, a television is connected to a game console 11 that includes an optical drive for media playback (e.g., a Blu-ray® Disc drive), such as a PlayStation®3 provided by Sony Corporation of Japan. The game console is connected to a camera and a microphone, such as a PlayStation®Eye available from Sony Corporation of Japan. In this case, the game console (either alone or in combination with the television, media player, and/or computer system) may be enabled to perform needed functionality according to present principles.

The microphone and optional camera can be located at various points in the system, such as connected to the computer system 19, the media player 17, the game console 11, or the television 24. The microphone 16 and optional camera 15 can be integral to any of these components as well.

In one implementation, the media player or game console (or media player or game console integrated into a display such as the television) provides video and audio for the movie (or television show) from recorded or streamed media to the display such as the television. The television displays the video portion (collectively, "movie video") and plays the audio portion (collectively, "movie audio") from the media player. The microphone captures speech from the user, converts the user audio segment to audio data, and provides the audio data to the computer system (or alternatively media player or game console, depending on implementation and depending on which device is to perform the comparison). The audio signal may also be converted to audio data within the media player in an alternative implementation. In the below description, for brevity, it is assumed that the steps needed to perform the movie karaoke generally are performed on a media player, however, it will be understood that such steps may be performed on a computer system, television, or on a combination of such devices.

The media player can directly compare the captured audio data ("user audio segment") to movie audio, either directly via comparison of sound files, or via a comparison of text after a step of voice (and other audio) recognition is performed, which results in data termed "user text". In the case where text is compared, the text corresponding to the movie audio may be determined either by a step of voice or speech recognition performed on the movie audio or via direct access of movie subtitles or closed captioning data. These types of 'direct' comparisons may be generally performed on the fly, in real time, and the determination of which movie audio (or subtitles) to compare may be on the basis of comparison of time stamps, one from the user audio segment and/or user text and another from the movie audio and/or subtitles.

Figure 2:
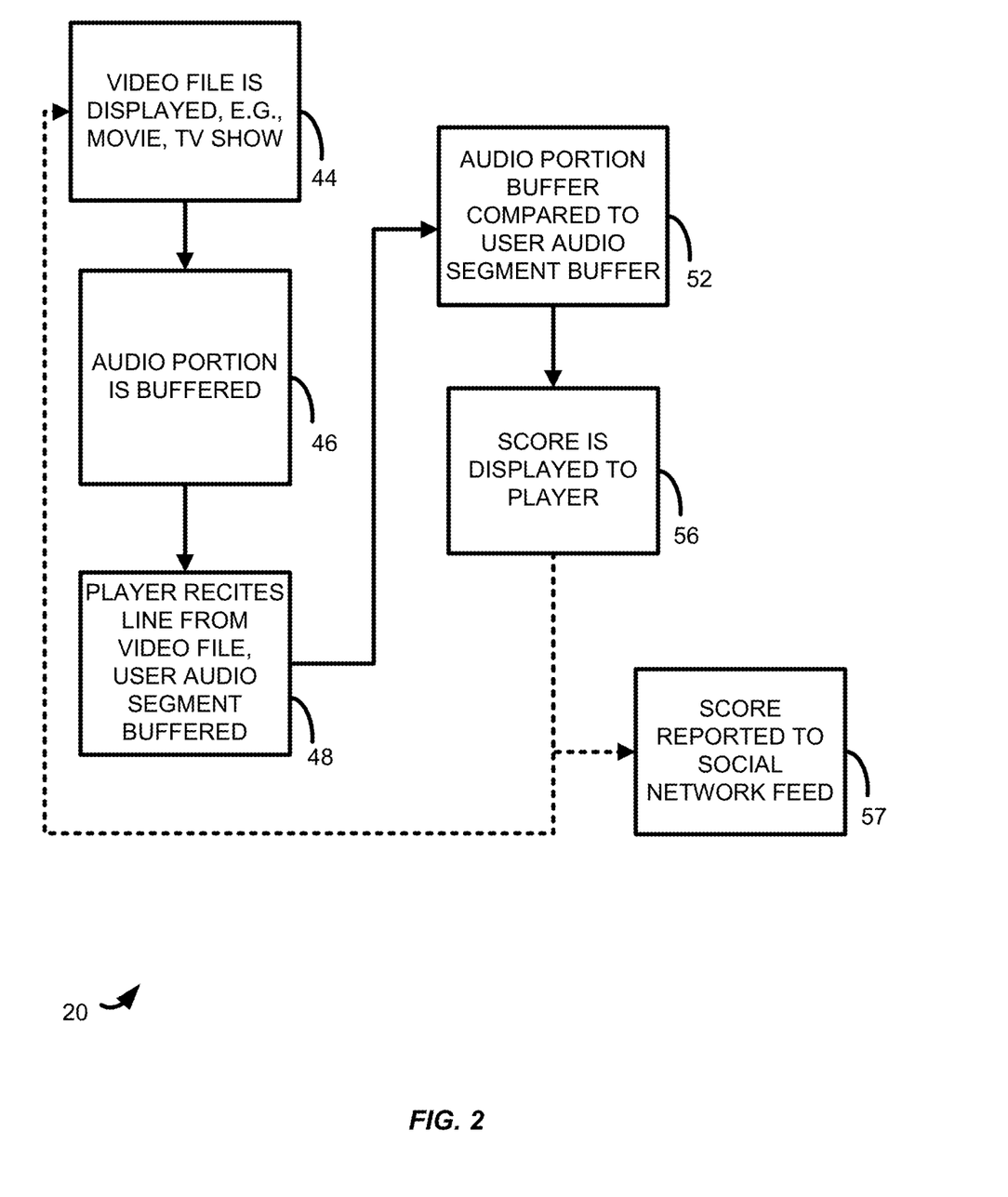
FIG. 2 is a flowchart of a method according to present principles.

In the first method, as illustrated by the flowchart 20 of FIG. 2, a first step is that a video file is displayed (step 44), e.g., by being played back or streamed. The video file may be, e.g., a movie, TV show, video, or the like. Here it is assumed that a movie is being watched, but it will be understood that systems and methods according to present principles may apply to any such files, including television shows, clips, and either as downloaded or streamed content. In the implementation of FIG. 2, an audio portion of the movie may then be buffered or cached (step 46).

In performing "movie karaoke", a user may then recite a line of dialogue from the movie, generally at or near the time the line appears in the movie (step 48). In particular, the media player may associate a time stamp with the user audio segment, and may use the time stamp as a guide to determine what audio data (or textual data, as described with respect to the implementation of FIG. 3) within the movie audio to compare to the user audio segment.

Such a user audio segment, e.g., with associated time stamp, is then received in the system and also buffered or cached. The buffer from step 46 and the buffer from step 48 are then compared. In the implementation of FIG. 2, the audio waveforms of the user audio segment and the movie audio are compared, and thus this step is to compare the movie audio portion buffer with the user audio segment (recitation) buffer (step 52). While buffers and caches are described in this implementation as examples, it will be understood that the comparison may occur in a number of ways, so long as two sets of data may be compared for likenesses, differences, and the like. Such includes comparison of streamed data, for instance.

Finally, a score may be reported to the player (step 56) corresponding to how well the audio waveforms compared. In another implementation, the score may be reported to a social networking feed to allow the same to appear as native content in a social network (step 57).

It is understood that the user may not recite the line at the same time as the movie audio plays back the line. Accordingly, the buffer noted in step 46 may hold or cache a certain portion of movie audio, e.g., the last five or ten seconds, or more, so as to allow comparison of all the buffered movie audio to that present in the user audio segment. In so doing, the system and method may "wait" for a user audio segment to appear or otherwise become available, and then perform the comparison. Alternatively, as noted above, the computer system may mark the captured user audio segment (e.g., with a timestamp) and compare movie audio having a similar timestamp, e.g., that appearing within five seconds (or ten or fifteen seconds) of the time stamp of the user audio segment.

In some cases, all or a portion of the entire movie audio may be pre-analyzed to determine its audio waveform or signature, such that this step need not be performed on the fly or in real time. In this case, the result of the pre-performed analysis may then be stored on the media disc or provided to the media player upon downloading or streaming playback.

In another implementation, the user audio segment is converted to text prior to the comparing step. In particular, and referring to the flowchart 30 of FIG. 3, a first step is that a video file is played back (step 58). As noted, the video file may be, e.g., a movie, TV show, video, or the like.

Figure 3:
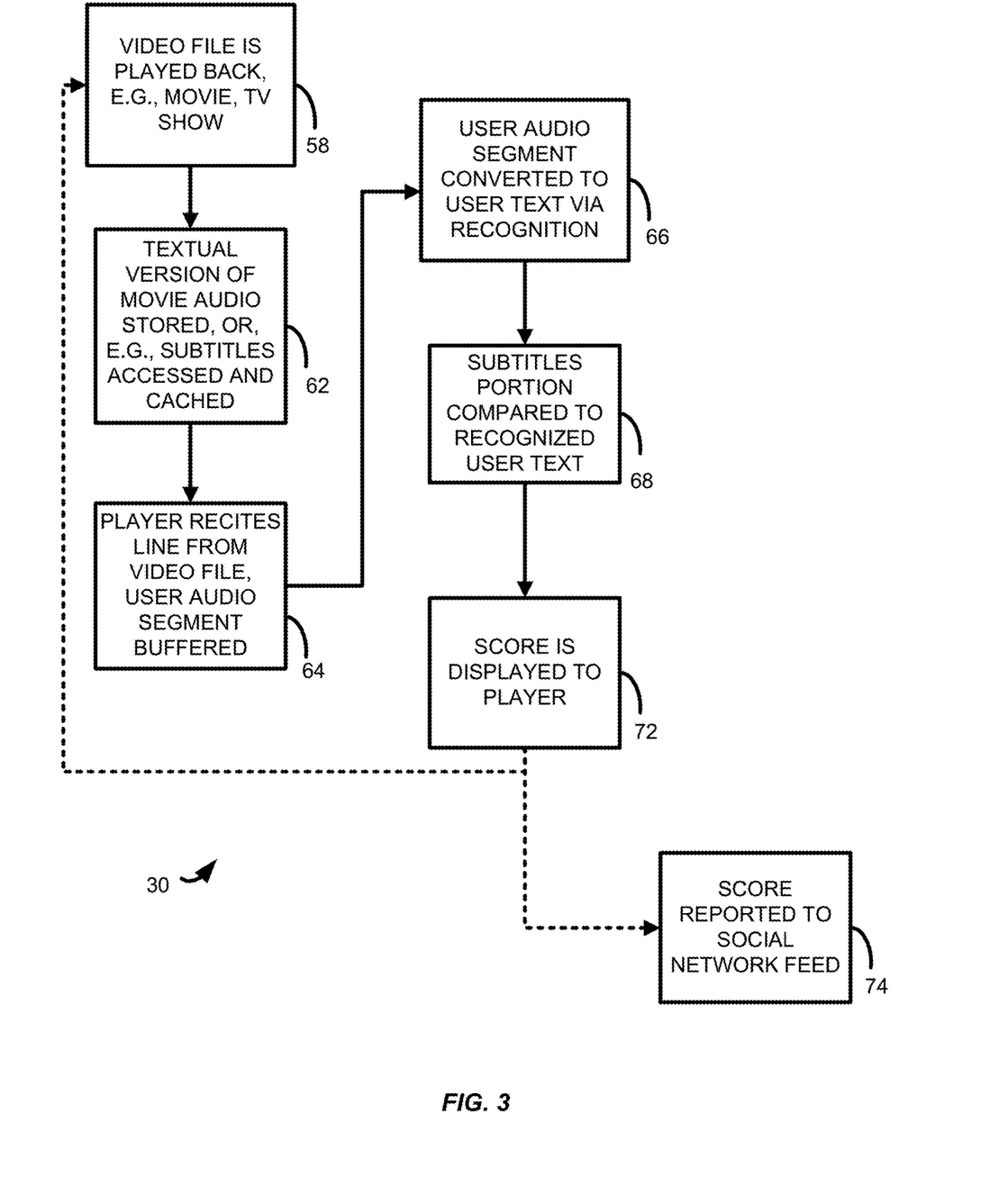
FIG. 3 is a flowchart of another method according to present principles.

A subtitles or closed-captioning portion may then be buffered, cached, or otherwise stored for comparison (step 62). In other words, data representing dialogue already in textual form may be stored for comparison. This portion may have a sliding window, e.g., the last 30 seconds, 15 seconds, 10 seconds, or 5 seconds of dialogue.

In an alternative implementation, a portion of movie audio such as captured in step 46 may be cached, buffered, or otherwise stored, and then converted to text via a step of voice recognition. Alternatively, in another implementation, the entire movie audio (or at least the spoken portion) may undergo such a step, and the results stored for later comparison, e.g., based on time stamp.

A user then recites a line of dialogue from the movie, generally around the time the line appears in the movie (step 64), and the same is received in the system and also buffered as the user audio segment. The audio data from step 64 may then be converted to text via a step of voice recognition (step 66). The textual data from the movie may then be compared to the textual data from the text recognition step of the user audio segment (step 68).

Finally, a score may be reported to the player (step 72) corresponding to how well the texts compared, e.g., on the basis of likeness, differences, or via other means. For example, the texts may be compared for key or important terms, or the like. The score may also be reported to a social network, e.g., to a social networking feed to allow the same to appear as native content in a social networking site (step 74).

Whether text or an audio waveform, the media player compares the user data to the movie data and generates a score representing how closely the user data matches the movie data (e.g., a range from 1 to 100, with 100 representing a perfect match). Where audio data is compared, the comparison can be on the basis of intonation, volume, pitch, actor speech profile, etc. For example, referring to the diagram of FIG. 4, line i' represented by element 14 may be compared to line i represented by element 18 in a number of ways, including based on timing 34, e.g., did the user start the line on time, end the line on time, etc. The comparison may also be on audio likenesses 36, e.g., pitch, intonation, etc. These aspects may be deduced from the signal waveform, and/or the waveforms themselves may be compared. Where text data is compared, a comparison 33 is generally simply based thereon. Whether text or waveform based, time stamps 35 may be compared to determine timeliness of the speech versus the movie dialogue version.

Figure 4:
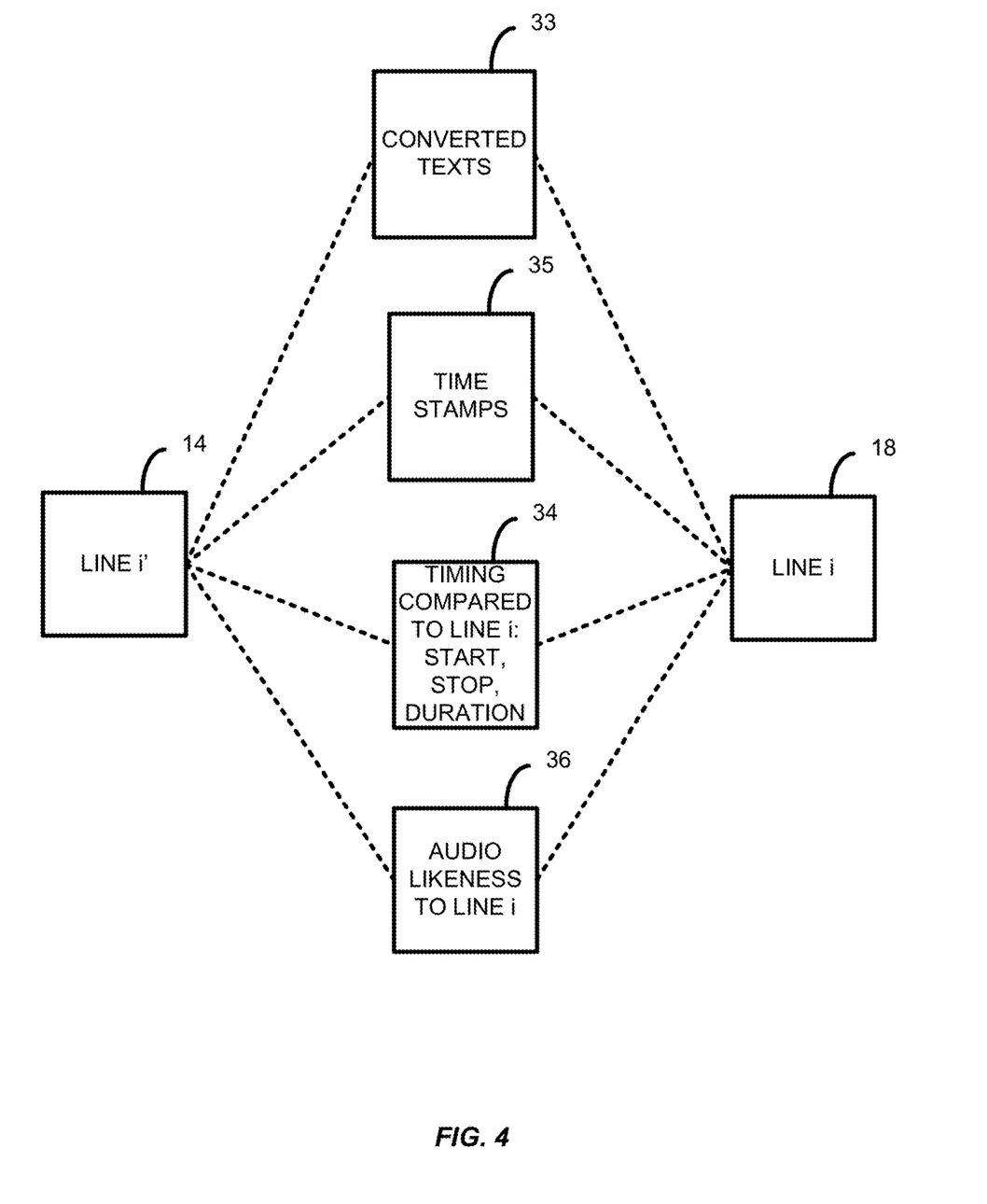
FIG. 4 illustrates exemplary ways in which user audio segments may be compared with dialogue from a video.

As noted generally the line spoken by the user will be close in time to the line from movie audio, and so only movie audio from near the same time as the user audio segment (as determined by timestamp) will need be compared. However, such is not a requirement. Indeed, the user audio segment may be compared with any (or all) of the movie audio. In the same way, the converted user audio segment in text form may be compared with any of the available text (or all of the text) from a movie. Particular text, even text not quoting the movie dialogue, may be entered to determine how similar such text is to the movie. For example, a user may enter text to determine how "Star-Wars-like" the text is.

Figure 5:
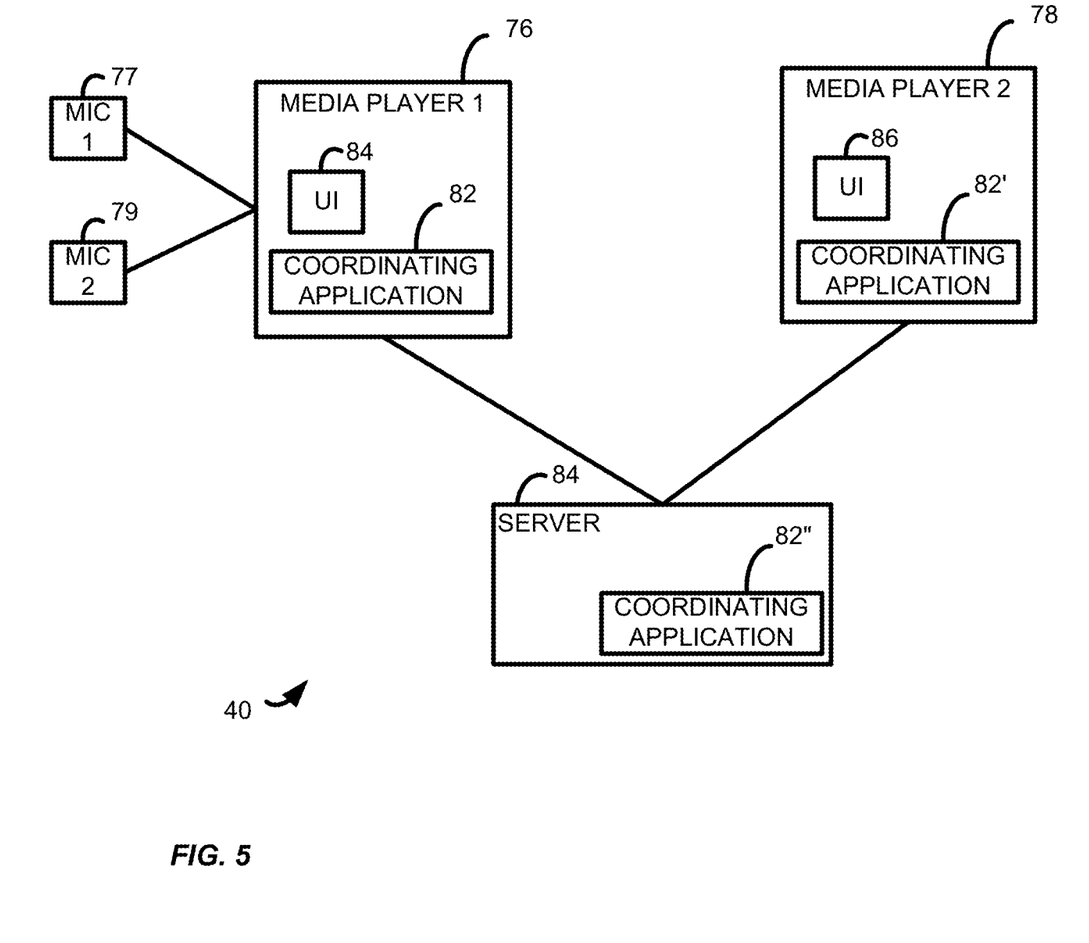
FIG. 5 is a schematic layout of various types of multi-player systems according to present principles.

Referring to FIG. 5, the method may be implemented on a media player 76 using a user interface 84. Using the UI, the user can further be provided with various options so as to select which comparisons to use to adjust difficulty in scoring, e.g., text versus audio waveform, or to enter selections such as easy-medium-difficult, and so on. The system and UI can further provide an option to display text on the screen, such as all or a portion of target text to help the user during game play, which in some cases may be accompanied by a reduction in score. In any case, as noted, the computer system provides the score to the television and the television may display the score, overlaid on the currently-displayed video.

In one implementation, the UI 76 may also provide a means and game interface to control the experience. In one example, the game interface may determine which movies or clips to use and may further track scores of the players. The system can access clips stored within the system or on local media (e.g., Blu-ray® Disc), or retrieve clips from a network content server (e.g., secure streaming or download). Using network content allows the system to use a wider range of clips and clips that are very recent (e.g., clips could be made available for use in the game before the movie is available for purchase or rental). Using clips also allows various ways to organize the game. For example, the users could be challenged with clips from multiple episodes of a series (movies, television, web, user-generated content, etc.), or clips that have a common theme, character, or actor across multiple sources.

As noted in the flowcharts, in some implementations, the media player may also send the score with user information to a network server, such as for a leaderboard, a social network service (e.g., Facebook™ or Twitter™), or a messaging server (e.g., email). Other users can then view the score and appreciate the performance of the user. In one implementation, the computer system also sends an audio clip of the speech with the score. A leaderboard service can organize the scores and clips to help people find the best (and worst) performances and also particular performances, such as those from friends or people they are following. In one implementation, users can also post ratings and comments, and discuss scores and recordings.

The scores and clips can also be used to develop additional metadata for a user profile, such as which movies or genres a user likes. For example, a user that can recite all of the lines from the movie "Stripes" may also like other movies featuring the actor Bill Murray. Similarly, if a user is good at matching particular quotes, that pattern can be used as part of the profile (e.g., reflecting sense of humor or topical interest; for example, a user that tends to get quotes correct related to Spider Man may have interest in Spider Man content and products). That information can be used to identify potential connections for the user (possible friends or groups) or recommendations for the user (other Bill Murray projects or related products). In another example, information for high scoring performances or users can be sent to content providers (e.g., as a recruiting mechanism for voiceover work).

In another implementation, multiple people can participate at the same time. In one example, and referring to FIG. 5, two people are at different locations and watching the same movie using media players 76 and 78 with a voice chat connection open through a network, e.g., through a server 84, so they can hear one another. A coordinating application 82, 82', or 82" may be resident on one or more of the media players and/or on the server to coordinate transmission of speech to other media players and to coordinate transmission and display of scores, as well as to coordinate mutual or cumulative scoring schemes. Each person has a microphone. As each person says lines of dialogue the person receives a score and the lines may be transmitted to the other media players. The people can use the scores to compete. Group scores may be generated for overall performance of players using the one or more media players.

In another example, two people are at the same location and alternate speaking lines of dialogue, e.g., using microphones 77 and 79, where the movie karaoke application running on the media player is configured to accept multiple inputs. Alternatively in this implementation, each person has an assigned role or character(s) and speaks dialogue for the assigned character. Scoring can be used for the players to share and compete. Combining the individual scores creates a group score that can be used to post and compete with other groups.

In another implementation, at least some dialogue in the movie is muted or removed. In this case the user says the missing dialogue and is scored on accuracy. For example all the lines for a particular character are muted and the user says that character's dialogue. In a group example, each player is assigned (or selects) a character and the assigned characters' dialogue is muted, to be said by the assigned players. In one example, the players are at different locations. For a particular player, only that player's character's dialogue is muted. Alternatively, all the assigned characters' dialogue is muted, but the audio from the other players' speech is played instead of the muted dialogue. Alternatively, previously recorded user speech can be played as part of the user experience. For example, a user can view a clip with their friend's performance used instead of the original audio (either while the user is speaking dialogue as well or just for listening). While the above example describes a case where the players are in different locations, the exemplary configuration may also be employed where the users are together and operating a common media player.

In another implementation, a user can practice lines of dialogue by saying them after the dialogue is spoken (while the video and audio is paused). The user can repeat the dialogue practice several times and receive scores as feedback for progress. The system can automatically control difficulty as the user improves, e.g., whether to have the user repeat the dialogue, whether to replay the target dialogue, whether to display text. This approach can also be used for other applications, such as an actor learning dialogue for a play, a student practicing a speech or song, or a student practicing new vocabulary, a foreign language, or pronunciation (for accents or speech therapy, as examples).

In one implementation, the user speaks dialogue in a different language from the original or played audio. The speech is converted to text and compared with subtitle text for the movie. The display of subtitles can be turned on or off to adjust difficulty. In one such example, the video and/or audio playback stops (manually or automatically) to allow the user time to speak the dialogue in the target language. The player can repeat the segment until a target proficiency or number of repetitions has been achieved. Other aspects including scoring may be as described above.

In another implementation, the user can match actions to the video as well as speech (or instead of). For example, a user can move in front of a camera and the system compares the captured performance with the actions in the corresponding video (e.g., position, expression, motion, using known motion capture techniques and analysis for comparison). Examples of motion include, but are not limited to, dancing, fighting, sports, yoga, and other physical techniques (e.g., stretching, brushing teeth, smiling). These motion challenges are useful for entertainment, education, therapy, etc. In another example, in addition to (or instead of) speech and/or motion, the user can match singing or music in content (e.g., piano). In yet another implementation, the captured video (and/or still images) is also compared for appearance, such as costume or makeup.

One implementation includes one or more programmable processors and corresponding computer system components to store and execute computer instructions, such as to provide the audio and video capture and comparisons, and the network communication for sharing.

Additional variations and implementations are also possible. While the source content is discussed above mainly as movies, other sources of recorded content can also be used in other implementations, such as television or internet video (programs or advertising), theater or musical performances, games, written text. For example, the user's spoken dialogue could be compared against a text source, such as a screenplay or script. While the term 'dialogue' is used to mean spoken lines from a video, the same is not intended to be exclusive, e.g., monologues, singing, or the like may also be compared. Musicians may be enabled to play an instrument as a part of a soundtrack and be graded on their playing and how close the sound from their instruments is to instruments appearing in the soundtrack. In yet another implementation, the computer system compares and scores video captured with video or images from a movie, such as dancing, a pose, or a costume. The television can be any other sort of display, e.g., that used in a movie theater, restaurant, karaoke bar, or the like. The comparison of the user entered data and target data may include comparing respective textual data, waveform data, code data, signal data, and/or data in other intermediate forms.

One implementation includes one or more programmable processors and corresponding computer system components to store and execute computer instructions and data, such as to provide the structures, systems, and interfaces to provide the movie karaoke system. One such computing environment is disclosed below.

Figure 6:
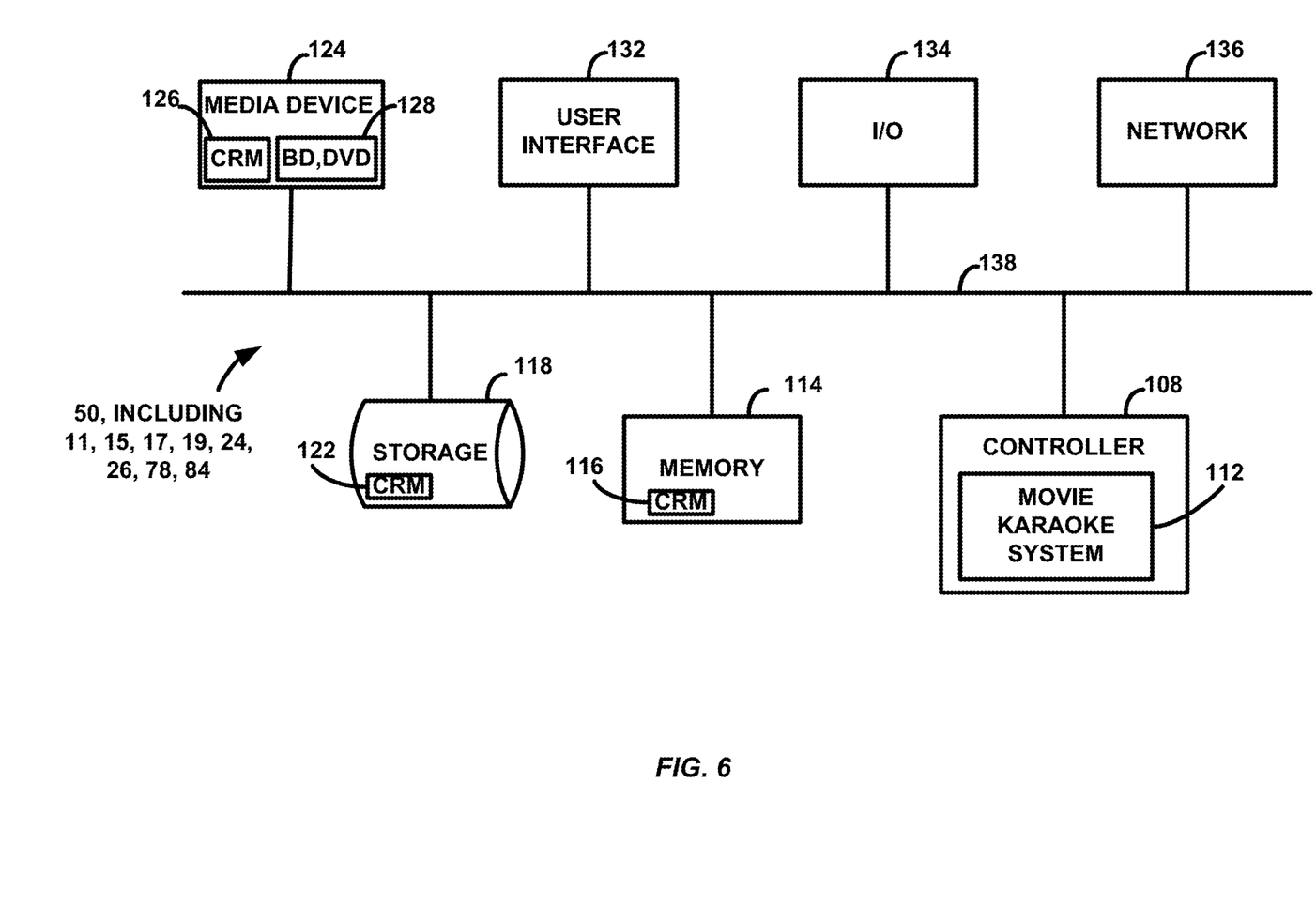
FIG. 6 is a schematic diagram of an exemplary computing environment according to present principles, which may embody a media player, game console or other computing systems described here.

Referring to FIG. 6, a representation of an exemplary computing environment 50 in which the system and method may be implemented is illustrated.

The computing environment 50 includes a controller 108, a memory 114, storage 118, a media device 124, a user interface 132, an input/output (I/O) interface 134, and a network interface 136. The components are interconnected by a common bus 138. Alternatively, different connection configurations can be used, such as a star pattern with the controller at the center.

The controller 108 includes a programmable processor and controls the operation of a movie karaoke system 112. The controller 108 loads instructions from the memory 114 or an embedded controller memory (not shown) and executes these instructions to control the system.

Memory 114, which may include non-transitory computer-readable memory 116, stores data temporarily for use by the other components of the system. In one implementation, the memory 114 is implemented as DRAM. In other implementations, the memory 114 also includes long-term or permanent memory, such as flash memory and/or ROM.

Storage 118, which may include non-transitory computer-readable memory 122, stores data temporarily or long-term for use by other components of the system, such as for storing data or instructions. In one implementation, the storage 118 is a hard disc drive, a solid state drive, or cloud storage.

The media device 124, which may include non-transitory computer-readable memory 126, receives removable media and reads and/or writes data to the inserted media. In one implementation, the media device 124 is an optical disc drive or disc burner, e.g., a writable Blu-ray® disc drive 128. The media device 124 may provide the video employed in the movie karaoke system described here.

The user interface 132 includes components for accepting user input, e.g., the user indication of selections of movies, actors, genres, and the like. The controller 108 uses inputs entered by the user to adjust the operation of the computing environment.

The I/O interface 134 includes one or more I/O ports to connect to corresponding I/O devices, such as external storage or supplemental devices, e.g., a printer or a PDA. In one implementation, the ports of the I/O interface 134 include ports such as: USB ports, PCMCIA ports, serial ports, and/or parallel ports. In another implementation, the I/O interface 134 includes a wireless interface for wireless communication with external devices, e.g., to and from a camera assembly. These I/O interfaces may be employed to connect to one or more content playback devices. These I/O interfaces may also be employed to connect to cameras and microphones employed by the systems as described.

The network interface 136 allows connections with the local network and includes a wired and/or wireless network connection, such as an RJ-45 or Ethernet connection or Wi-Fi interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file-storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the noted system where movie karaoke is contemplated, the plural inputs may allow plural users to input data, e.g., movie lines, at the same time.

The invention claimed is:

1. A method for operating a karaoke environment, comprising:
   a. playing back video with corresponding audio on a display;
   b. receiving speech as a user audio segment using a microphone, and buffering or caching the received speech as a first audio waveform;
   c. marking the user audio segment with a timestamp;
   d. retrieving a second audio waveform for the displayed video based on the timestamp, wherein the second audio waveform for the displayed video is determined by analyzing the audio corresponding to the video, and buffering a certain portion of the analyzed audio corresponding to the video;
   e. waiting for a comparable portion of the first audio waveform to appear or become available in the buffered analyzed audio corresponding to the video, and then, using a processor, comparing the first audio waveform of the user audio segment marked with the timestamp to the comparable portion of the second audio waveform for the displayed video on a basis of pitch and intonation as deduced from the first and second audio waveforms, the comparable portion having another timestamp associated therewith, and wherein the comparing is further on the basis of the timestamp and the another timestamp; and
   f. generating a score based on a result of the comparing between the first and second audio waveforms.

2. The method of claim 1, further comprising:
   a. sending the score to a network server; and
   b. retrieving a score from the server associated with another user.

3. The method of claim 1, wherein the received speech is in a different language than a language on the video.

4. The method of claim 1, further comprising transmitting the score for display on a social networking site.

5. The method of claim 1, wherein the steps are performed on a game console, a media player, a computer system, or a combination of the above.

6. The method of claim 1, further comprising receiving an input from a user corresponding to a desired difficulty level, and wherein the generating a score is further based on the difficulty level.

7. The method of claim 6, wherein at a low difficulty level, the method further comprises displaying the target text.

8. The method of claim 1, further comprising muting or removing a portion of audio in the video.

9. The method of claim 1, further comprising:
   a. using a camera to detect a user motion;
   b. comparing the user motion with a stored record of a character motion within the video;
   c. generating a motion score based on the compared user motion and stored record of a character motion; and
   d. wherein the generating a score includes generating a score based on the motion score.

10. The method of claim 1, further comprising selecting an item of content for a subsequent displaying step based on the generated score.

11. The method of claim 10, wherein the item of content is different from the displayed video.

12. A non-transitory computer readable medium, comprising instructions for causing a computing environment to perform the method of claim 1.

13. The method of claim 1, further comprising muting a portion of the corresponding audio during the playing back, the muted portion corresponding to the portion comparable to the first audio waveform, and playing back the first audio waveform in place of the muted portion of the second audio portion during the playing back.

14. The method of claim 1, further comprising:
   playing back the portion of the second audio waveform comparable to the first audio waveform;
   pausing the playing back;

receiving another speech as a user audio segment using a microphone;

comparing the received another speech to the portion of the second audio waveform comparable to the first audio waveform;

generating a score based on a result of the comparing; and repeating the playing back, pausing, receiving, and comparing steps.

15. The method of claim 14, further comprising automatically controlling difficulty, including one or more steps selected from the group consisting of: automatically controlling whether to repeat the user audio segment, whether to replay the portion of the second audio waveform comparable to the first audio waveform, or whether to display text based on the portion of the second waveform comparable to the first audio waveform.

16. A method for operating a karaoke environment, comprising:

a. arranging at least two media players to be in network communication, each media player configured to perform steps of:

i. playing back video with corresponding audio on a display;

ii. receiving a selection of a character portrayed on the displayed video;

iii. receiving speech as a user audio segment using a microphone, and buffering or caching the received speech as a first audio waveform;

iv. marking the user audio segment with a timestamp;

v. retrieving a second audio waveform for the displayed video based on the timestamp, wherein the second audio waveform for the displayed video is determined by analyzing audio corresponding to the video, and buffering a certain portion of the analyzed audio corresponding to the video;

vi. waiting for a comparable portion of the first audio waveform to appear or become available in the buffered analyzed audio corresponding to the video, and then, using a processor, comparing the first audio waveform of the user audio segment marked with the timestamp to the comparable portion of the second audio waveform for the displayed video on a basis of pitch and intonation as deduced from the first and second audio waveforms, the comparable portion having another timestamp associated therewith, and wherein the comparing is further on the basis of the timestamp and the another timestamp; and vii. generating a score based on a result of the comparing between the first and second audio waveforms; and viii. transmitting each user audio segment from the receiving media player to the other media player or players for playback.

17. The method of claim 16, further comprising generating an overall score for each of the at least two media players based on generated scores for all received speech.

18. The method of claim 16, further comprising generating a group score based on the generated overall score for each of the at least two media players.

19. The method of claim 16, further comprising, in each of the at least two media players, and for the selected character, muting or removing a portion of audio in the video, the muted or removed portions corresponding to the target text.

20. The method of claim 16, further comprising, for each of the at least two media players, using a camera to detect a user motion, comparing the user motion with a stored record of a character motion within the video, generating a motion score based on the compared user motion and stored record of a character motion, and wherein the generating a score includes generating a score based on the motion score.

21. A non-transitory computer readable medium, comprising instructions for causing a computing environment to perform the method of claim 16.

* * * * *